(12) United States Patent
Grimm et al.

(10) Patent No.: US 11,472,387 B2
(45) Date of Patent: Oct. 18, 2022

(54) BRAKE SYSTEM AND METHOD FOR OPERATING A BRAKE SYSTEM OF THIS KIND

(71) Applicant: Continental Teves AG & Co. oHG, Frankfurt am Main (DE)

(72) Inventors: Robert Grimm, Frankfurt am Main (DE); Jochen Zimmermann, Frankfurt am Main (DE); Christian Courth, Frankfurt am Main (DE); Jochen Beuss, Frankfurt am Main (DE)

(73) Assignee: Continental Teves AG & Co., oHG

( * ) Notice: Subject to any disclaimer, the term of this patent is extended or adjusted under 35 U.S.C. 154(b) by 47 days.

(21) Appl. No.: 16/758,273

(22) PCT Filed: Oct. 22, 2018

(86) PCT No.: PCT/EP2018/078855
§ 371 (c)(1),
(2) Date: Apr. 22, 2020

(87) PCT Pub. No.: WO2019/081413
PCT Pub. Date: May 2, 2019

(65) Prior Publication Data
US 2020/0339086 A1 Oct. 29, 2020

(30) Foreign Application Priority Data
Oct. 24, 2017 (DE) ..................... 10 2017 218 999.1

(51) Int. Cl.
*B60T 13/74* (2006.01)
*B60T 8/32* (2006.01)
(Continued)

(52) U.S. Cl.
CPC ............ *B60T 8/326* (2013.01); *B60T 13/662* (2013.01); *B60T 13/686* (2013.01); *B60T 13/745* (2013.01); *B60T 17/02* (2013.01)

(58) Field of Classification Search
CPC ............ B60T 13/745; B60T 2270/402; B60T 2270/404; B60T 2270/413; B60T 13/686
See application file for complete search history.

(56) References Cited

U.S. PATENT DOCUMENTS 6,209,966 B1 4/2001 Mies
6,299,261 B1 * 10/2001 Weiberle ................. B60T 8/885
303/122.04

(Continued)

FOREIGN PATENT DOCUMENTS

CN 1020130102059 A 9/2013
CN 106184173 A 12/2016
(Continued)

OTHER PUBLICATIONS

Korean Notification of Reason for Refusal for Korean Application No. 10-2020-7011894, dated Apr. 21, 2021 with translation, 21 pages.

(Continued)

*Primary Examiner* — Bradley T King
(74) *Attorney, Agent, or Firm* — RatnerPrestia

(57) ABSTRACT

A brake system for a motor vehicle with at least four hydraulically activated wheel brakes, including for each of the wheel brakes an electrically activated first wheel valve which is designed to be open when de-energized and an electrically activated second wheel valve which is designed to be closed when de-energized, a first electrically activated pressure source, which is connected to the first wheel valves via a first brake supply line, a second electrically activated pressure source, and a pressure medium reservoir vessel which is, in particular, at atmospheric pressure, wherein the (Continued)

second electrically activated pressure source is connected to the second wheel valves via a second brake supply line, and a method for operating said brake system.

20 Claims, 1 Drawing Sheet

(51) Int. Cl.
*B60T 13/66* (2006.01)
*B60T 13/68* (2006.01)
*B60T 17/02* (2006.01)

(56) References Cited

U.S. PATENT DOCUMENTS

| | | | |
|---|---|---|---|
| 9,096,206 B2 | 8/2015 | Linkenbach et al. | |
| 9,738,263 B2 | 8/2017 | Jung | |
| 10,351,110 B2 | 7/2019 | Besier et al. | |
| 2002/0050739 A1* | 5/2002 | Koepff | B60T 8/348 303/122.09 |
| 2011/0248558 A1* | 10/2011 | Vollert | B60T 1/10 303/3 |
| 2013/0147259 A1* | 6/2013 | Linkenbach | B60T 13/745 303/14 |
| 2014/0028083 A1* | 1/2014 | Gerdes | B60T 8/4077 303/6.01 |
| 2014/0152085 A1* | 6/2014 | Biller | B60T 8/441 303/10 |
| 2016/0009263 A1* | 1/2016 | Feigel | B60T 8/321 303/15 |
| 2016/0009267 A1 | 1/2016 | Lesinski | |
| 2016/0023644 A1* | 1/2016 | Feigel | B60T 13/147 303/3 |
| 2016/0167632 A1 | 6/2016 | Deng et al. | |
| 2018/0334148 A1* | 11/2018 | Feigel | B60T 13/662 |
| 2019/0308601 A1* | 10/2019 | Maj | B60T 7/042 |
| 2019/0322261 A1* | 10/2019 | Hienz | B60T 13/58 |
| 2019/0344769 A1* | 11/2019 | Zimmermann | B60T 13/168 |
| 2021/0053540 A1* | 2/2021 | Besier | B60T 8/17 |

FOREIGN PATENT DOCUMENTS

| | | |
|---|---|---|
| CN | 106458192 A | 2/2017 |
| DE | 102013217954 A1 | 3/2015 |
| GB | 2225397 A | 5/1990 |
| WO | 9839189 A1 | 9/1998 |
| WO | 2015104122 A1 | 7/2015 |

OTHER PUBLICATIONS

German Search Report for German Application No. 10 2017 218 999.1, with partial English translation, dated Sep. 18, 2018, 8 pages.
International Search Report and Written Opinion for International Application PCT/EP2018/078855, dated Feb. 1, 2019, 11 pages.
International Search Report and Written Opinion for International Application PCT/EP2018/078855, dated Feb. 1, 2019, 16 pages (German).
Chinese Office Action for Chinese Application No. 201880069770.8, dated Oct. 9, 2021 with translation, 11 pages.
European Examination Report for European Application No. 18 800 485.7, dated May 27, 2022 with translation, 10 pages.

\* cited by examiner

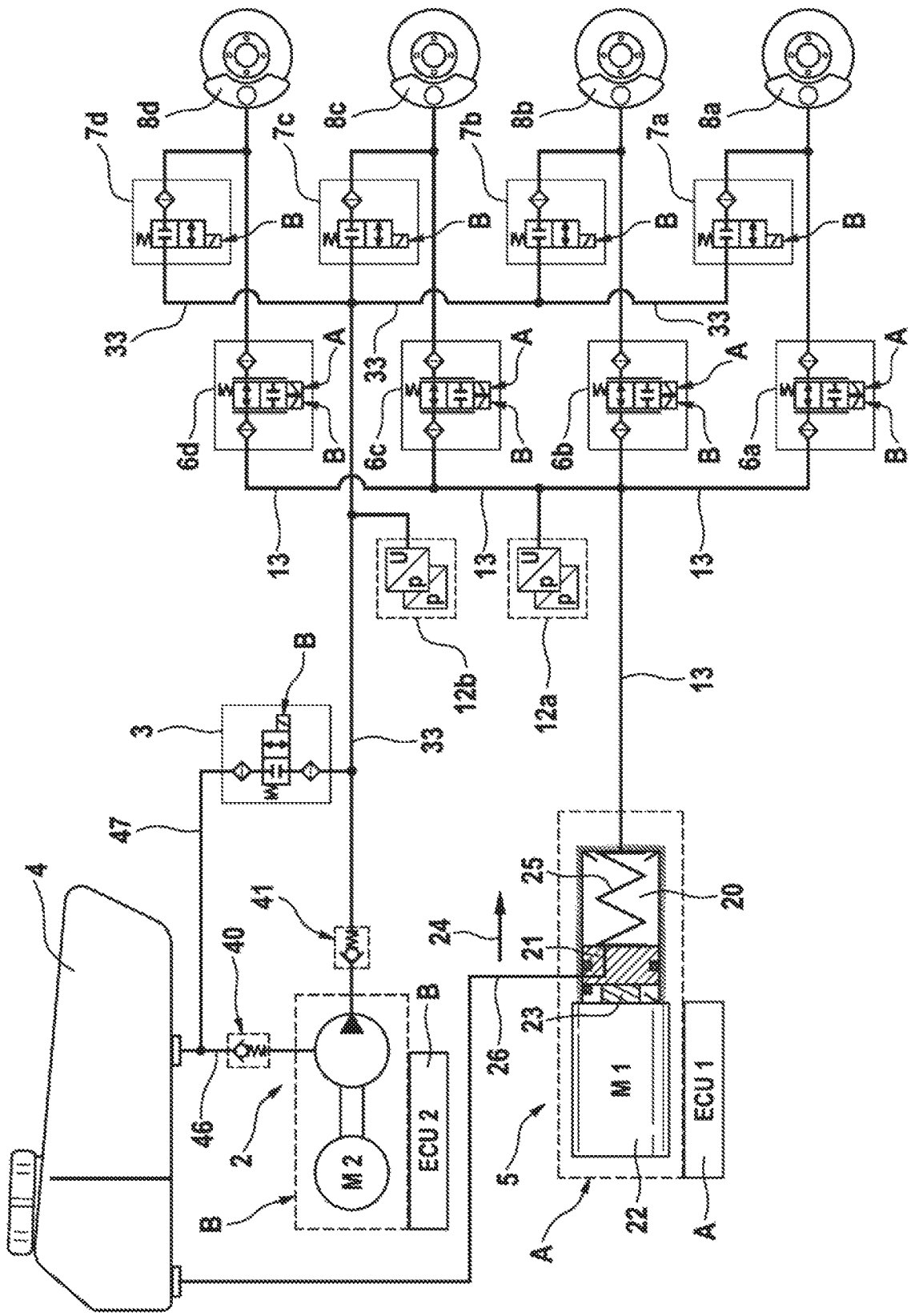

BRAKE SYSTEM AND METHOD FOR OPERATING A BRAKE SYSTEM OF THIS KIND

CROSS REFERENCE TO RELATED APPLICATIONS

This application is the U.S. National Phase application of PCT International Application No. PCT/EP2018/078855, filed Oct. 22, 2018, which claims priority to German Patent Application No. 10 2017 218 999.1, filed Oct. 24, 2017, the contents of such applications being incorporated by reference herein.

FIELD OF THE INVENTION

The invention relates to a brake system and to a method for operating such a brake system.

BACKGROUND OF THE INVENTION

A generic brake system with two electrically controllable pressure sources for a motor vehicle with four hydraulically activated wheel brakes is known from DE 10 2013 217 954 A1, incorporated herein by reference. In this context, the wheel brakes are connected, for the purpose of activation in various operating modes, to the two electrically controllable pressure sources and also to a brake pedal-activated master brake cylinder. The brake system comprises not only wheel-specific inlet valves and wheel-specific outlet valves which connect the wheel brakes to the pressure medium reservoir vessel but also a circuit isolating valve and a total of four isolating valves for disconnecting the master brake cylinder and the electrically controllable pressure sources from the inlet valves. The brake system furthermore comprises a central open-loop and closed-loop control unit, a first open-loop and closed-loop control unit which is assigned to the first pressure source, and a second open-loop and closed-loop control unit which is assigned to the second pressure source. The first and second open-loop and closed-loop control units serve in each case for the activation of the corresponding pressure source. The circuit isolating valve is activated by means of the central open-loop and closed-loop control unit. The activation of the two pressure source isolating valves is also carried out by means of the central open-loop and closed-loop control unit.

In future brake systems, which should also be suitable for highly automated driving, a mechanical and/or hydraulic fallback level, in which the driver can activate the wheel brakes using muscle power, is intended to be dispensed with. Irrespective of whether a mechanical-hydraulic fallback level is present or not, the brake systems for highly automated driving must have sufficient availability and be embodied in a "fail-operational" fashion. This applies to a hydraulic fault, such as e.g. a leak, or to an electrical fault, such as e.g. a failure of an electrical energy supply or a failure of an electronic actuation device.

SUMMARY OF THE INVENTION

An aspect of the present invention is a brake system with two electrically activated pressure sources as well as a method for operating such a brake system, which is suitable for highly automated or autonomously driving motor vehicles and has correspondingly sufficient availability. In this context, it is to be possible to manufacture the brake system cost-effectively.

An aspect of the invention is based on the concept that an electrically activated first wheel valve which is designed to be open when de-energized and an electrically activated second wheel valve which is designed to be closed when de-energized are provided for each of the wheel brakes, and that the first electrically activated pressure source is connected via a first brake supply line to the first wheel valves which are designed to be open when de-energized, and the second electrically activated pressure source is connected via a second brake supply line to the second wheel valves which are designed to be closed when de-energized. The first electrically activated pressure source is therefore connected, for the purpose of activating the wheel brakes, to each of the wheel brakes via the respective first wheel valve which is designed to be open when de-energized, and the second electrically actuated pressure source is connected, for the purpose of activating the wheel brakes, to each of the wheel brakes via the respective second wheel valve which is designed to be closed when de-energized.

An advantage of an aspect of the invention is that, despite a high level of availability in the event of hydraulic or electrical faults, in comparison with known brake systems with two electrically controllable pressure sources, fewer electrically activated valves are required and it is specifically possible to dispense with isolating valves arranged between the pressure sources and the wheel valves.

According to a first preferred embodiment, there is no electrically activated valve arranged in the first brake supply line, i.e. between the first electrically activated pressure source and the first wheel valves. This saves costs and avoids unnecessary flow resistances between the pressure source and wheel valves.

It is advantageous in the same way that there is preferably no electrically activated valve arranged in the second brake supply line, i.e. between the second electrically activated pressure source and the second wheel valves.

There is particularly preferably no valve, also no nonreturn valve, arranged in the first and the second brake supply lines.

According to a second preferred embodiment, a first electrically activated circuit isolating valve by means of which two of the first wheel valves can be hydraulically disconnected from the first pressure source is arranged in the first brake supply line. The circuit isolating valve permits demand-based division into two brake circuits with two wheel brakes each and therefore allows blending between the brake circuits.

A second electrically activated circuit isolating valve by means of which two of the second wheel valves can be hydraulically disconnected from the second pressure source is preferably also arranged in the second brake supply line, wherein the two second wheel valves are assigned to different wheel brakes than the two first wheel valves. Given a corresponding assignment of the wheel brakes the axles of the vehicle, axle-based blending is possible by means of the circuit isolating valves.

According to one preferred element of an aspect of the invention, the brake system comprises a first electronic device by means of which the first pressure source is activated, and a second electronic device by means of which the second pressure source is activated. In this context, the second electronic device is electrically independent of the first electronic device, with the result that an electrical or electronic fault in one of the electronic devices does not cause a failure of both electronic devices.

The two electronic devices are electrically independent of one another in the sense that a failure of the first electronic device does not cause a failure of the second electronic device and vice versa, that is to say the two electronic devices are electrically isolated.

The first electronic device is therefore advantageously supplied by a first electrical energy supply, and the second electronic device by a second (redundant) electrical energy supply, the first electrical energy supply being independent of the second electrical energy supply.

It is alternatively preferred that the first electronic device comprises a first electrical energy supply, and the second electronic device comprises a second electrical energy supply, the first electrical energy supply being independent of the second electrical energy supply.

The two electronic devices can be arranged in a common housing or on a common printed circuit board, for example in a common electronic open-loop and closed-loop control unit (ECU). Alternatively, the two electronic devices can be arranged in two separate housings or on two separate printed circuit boards, e.g. in two electronic open-loop and closed-loop control units (ECU1, ECU2).

The first electronic device is designed to activate or actuate the first pressure source. The first pressure source is preferably also supplied with electrical energy by the first electronic device. Correspondingly, the second pressure source is activated or actuated by means of the second electronic device. The second pressure source is preferably also supplied with electrical energy by the second electronic device.

The first wheel valves are preferably each designed to be able to be actuated in a duplicate fashion and each of the first wheel valves can be activated by means of the first electronic device and by means of the second electronic device. Therefore, activation of the wheel brakes is possible even in the event of a failure of the first electronic device or of the first energy supply in that by means of the second electronic device the second pressure source is actuated and the first wheel valves are closed, in order to prevent pressure medium flowing away via the first wheel valves.

The second wheel valves are preferably activated by means of the second electronic device. Therefore, activation of the wheel brakes is possible even in the event of a failure of the first electronic device or of the first energy supply in that by means of the second electronic device the second pressure source is actuated, the first wheel valves are closed and the second wheel valves are opened. The second wheel valves are particularly preferably activated exclusively by means of the second electronic device in order to keep the number of more cost-intensive valves which can be actuated in a duplicate fashion as low as possible.

Each of the pressure sources is preferably assigned a pressure sensor of redundant design in order to permit closed-loop control of the system pressure in the first and second brake supply lines.

According to one preferred embodiment of the invention, at least one of the pressure sources is embodied as a cylinder-piston assembly with a pressure space which is bounded by a piston which can be moved, by means of an electric motor and a rotational-translational transmission, in an activation direction to build up pressure in the pressure space and/or in the wheel brakes and in the direction opposite to the activation direction to reduce pressure in the pressure space and/or in the wheel brakes. Such pressure sensors can set chronological brake pressure profiles in a demand-based fashion and with high precision.

The cylinder-piston assembly is preferably embodied in such a way that in an unactivated state of the piston the pressure space is connected to the pressure medium reservoir vessel via at least one snifter hole, wherein this connection is interrupted when the piston is activated.

A resetting element, which positions the piston in the unactivated state when the electric motor is de-energized, is preferably provided in the pressure space of the cylinder-piston assembly. The rotational-translational transmission is advantageously of a non-self-locking design for this purpose. Therefore, in the event of a failure of the first pressure source or of the first electronic device, the piston is positioned in the unactivated state, as a result of which the connection from the pressure space to the pressure medium reservoir vessel is open. During an anti-lock brake control operation, pressure medium can then flow away via one of the first valves and the pressure space of the first pressure source to the pressure medium reservoir vessel via this connection, in order to carry out a reduction in pressure at the associated wheel brake. When the electric motor is de-energized, the resetting element particularly preferably positions the piston at a stop, counter to the activation direction.

According to one preferred embodiment of the invention, at least one of the pressure sources is embodied as a piston pump whose suction side is connected to the pressure medium reservoir vessel and whose pressure side is connected to the brake supply line which is assigned to the pressure source, wherein an electrically activated isolating valve is connected hydraulically in parallel with the piston pump.

This means that between the brake supply line and the pressure medium reservoir vessel there is a hydraulic connection in which the isolating valve is arranged. When the isolating valve is opened, pressure medium can be discharged from one of the wheel brakes via this connection and via the corresponding second wheel valve into the pressure medium reservoir vessel, so that, e.g. when making available pressure by means of the other pressure source, a reduction in pressure can be carried out at the corresponding wheel brake (e.g. for a wheel-specific closed-loop pressure control process). When pressure is made available by the piston pump, the isolating valve which is connected in parallel permits a closed-loop pressure control process through overflow. The isolating valve is particularly preferably designed to be closed when de-energized, in order to prevent unintentional flowing away of pressure medium into the pressure medium reservoir vessel.

The isolating valve is preferably activated by means of the electronic device which is assigned to the pressure source. The isolating valve is particularly preferably activated exclusively by means of the electronic device which is assigned to the pressure source, in order to keep the number of more cost-intensive valves which can be actuated in a duplicate fashion as low as possible.

According to one preferred environment of an aspect of the invention, the first pressure source is embodied as a cylinder-piston assembly, and the second pressure source as a piston pump.

An aspect of the invention also relates to a method for operating a brake system with two electrically activated pressure sources.

In the event of a failure of the first pressure source or of the first electronic device, the first wheel valves are preferably closed, the second wheel valves opened, and the second pressure source activated to build up a pressure. In this context, the first wheel valves, the second wheel valves and the second pressure source are particularly preferably activated by means of the second electronic device.

In the event of a failure of the first pressure source or of the first electronic device, a wheel-specific slip control process is preferably carried out, wherein a reduction in pressure is carried out at one of the wheel brakes by opening the corresponding first wheel valve, with the result that pressure medium flows away to the pressure medium reservoir vessel via the first pressure source and a return line. In this context, the second pressure source is particularly preferably activated in order to make available a brake pressure, and the corresponding first wheel valve/the corresponding first wheel valves is/are activated by means of the second electronic device.

In a normal operating mode during a normal braking process, preferably only the first pressure source is actuated to build up a pressure to activate the wheel brakes. In this context, none of the valves (i.e. no first wheel valve, no second wheel valve, no isolating valve) is activated.

A normal braking process is understood to be a braking process which is initiated by a driver or an autopilot function and during which the same brake pressure is applied to all the wheel brakes and no wheel-specific closed-loop brake pressure control process takes place.

In the normal operating mode, a wheel-specific slip control process is preferably carried out by actuating the first wheel valves, the second wheel valves and the isolating valve, wherein a reduction in pressure is carried out at one of the wheel brakes by opening the corresponding second wheel valve and the isolating valve.

BRIEF DESCRIPTION OF THE DRAWINGS

Further preferred embodiments of the invention will emerge from the dependent claims and the following description with reference to the figures.

FIG. 1 schematically shows an exemplary embodiment of a brake system according to an aspect of the invention.

FIG. 2 schematically shows another exemplary embodiment of a brake system according to an aspect of the invention, in which are provided optional first and second electrically activated circuit isolating valves. The depiction of the first and second electrically activated circuit isolating valves in FIG. 2 is for illustrative purposes only, and is not intended to signify any structural features of the valves depicted.

DETAILED DESCRIPTION OF THE PREFERRED EMBODIMENTS

In FIG. 1, an exemplary embodiment of a brake system according to an aspect of the invention for a motor vehicle with four hydraulically activated wheel brakes 8a-8d is illustrated schematically. The brake system comprises a first electrically controllable pressure source 5, a second electrically controllable pressure source 2, a pressure medium reservoir vessel 4 at atmospheric pressure, and a first electrically activated wheel valve 6a-6d (also referred to as an inlet valve) and a second electrically activated wheel valve 7a-7d (also referred to as an outlet valve) for each wheel brake 8a-8d.

The first wheel valves 6a-6d are designed to be open when de-energized, and the second wheel valves 7a-7d are designed to be closed when de-energized. The first wheel valves 6a-6d are advantageously of analogized or analog-actuated design, in order to permit precise setting of the pressure at the wheel brakes 8a-8d.

In order to activate the wheel brakes 8a-8d, both the first electrically activated pressure source 5 and the second electrically activated pressure source 2 are connected in a hydraulically disconnectable fashion to each of the wheel brakes 8a-8d. In this context, the first pressure source 5 is connected to the first wheel valves 6a-6d via a first brake supply line 13, and the second pressure source 2 is connected to the second wheel valves 7a-7d via a second brake supply line 33.

Each of the wheel brakes 8a-8d is therefore assigned a first wheel valve 6a-6d which is designed to be open when de-energized and a second wheel valve 7a-7d which is designed to be closed when de-energized. In this context, the first electrically activated pressure source 5 is connected to the wheel brakes 8a-8d via the first wheel valves 6a-6d (or the first pressure source is connected to each of the wheel brakes via the respective first wheel valve) and the second electrically activated pressure source 2 is connected to the wheel brakes 8a-8d via the second wheel valves 7a-7d (or the second pressure source is connected to each of the wheel brakes via the respective second wheel valve). The brake system does not contain any further (wheel) valves which are assigned to the individual wheel brakes 8a-8d.

For each wheel brake 8a, 8b, 8c, 8d, an output port of the first wheel valve 6a, 6b, 6c, 6d and an output port of the second wheel valve 7a, 7b, 7c, 7d are connected to one another and to the wheel brake. The input ports of the first wheel valves 6a-6d are connected in a direct hydraulic fashion to the first pressure source 5 and/or its pressure space via the first brake supply line 13, and the input ports of the second wheel valves 7a-7d are connected in a direct hydraulic fashion to the second pressure source 2 and/or its pressure space via the second brake supply line 33. The term "connected in a direct hydraulic fashion" is to be understood here in the sense that there is no electrically activated valve or even no valve (e.g. nonreturn valve) arranged in the second brake supply line 13 or 33.

A pressure sensor 12a which is of redundant design, is assigned to the first pressure source 5 and measures the pressure made available by the pressure source 5 is connected to the first brake supply line 13. Likewise, the second pressure source 2 is assigned a pressure sensor 12b which is a redundant design, measures the pressure made available by the pressure source 2 and is connected to the second brake supply line 33.

The brake system comprises a first electronic device A and a second electronic device B, the second electronic device B being electrically independent of the first electronic device A. The electronic devices A, B are electrically isolated. In the event of a fault in the first electronic device A, for example due to an electrical defect, the second electronic device remains fully functional.

The electronic device A comprises electrical and/or electronic components for actuating and activating the first pressure source 5 (indicated by the arrow with A in FIG. 1). Device A can be embodied, for example, as a first electronic open-loop and closed-loop control unit (ECU 1) or as a first part of an electronic open-loop and closed-loop control unit. The electronic device A can comprise a first electrical energy source, by means of which the device A itself and the pressure source 5 are supplied with energy, or device A is connected to a first electrical energy source (for example a first vehicle electrical system). The first pressure source 5 can be supplied with energy directly from the first electrical energy source or from the device A (that is to say indirectly from the first electrical energy source).

The electronic device B comprises electrical and/or electronic components for actuating and activating the second pressure source 2 (indicated by the arrow with B in FIG. 1).

Device B can be embodied, for example, as a second electronic open-loop and closed-loop control unit (ECU 2) or as a second part of an electronic open-loop and closed-loop control unit. The electronic device B can comprise a second electrical energy source, by means of which the device B itself and the pressure source 2 are supplied with energy, or device B is connected to a second electrical energy source (for example a second vehicle electrical system). In any case, for sufficient availability of the brake system, it is advantageous that the second electrical energy source is independent of the first energy source. The second pressure source 2 can be supplied with energy directly from the second electrical energy source or from the device B (that is to say indirectly from the second electrical energy source).

The first wheel valves 6a-6d are each designed to be able to be actuated in a duplicate fashion. For this purpose, the first wheel valves 6a-6d can each be provided with two actuation coils, wherein each of the actuation coils can activate the valve tappet.

Each of the first wheel valves can optionally be activated by means of the first electronic device A or by means of the second electronic device B. For this purpose, e.g. one of the actuation coils is actuated or energized by the first electronic device A and the other actuation coil by the second electronic device B.

The second wheel valves 7a-7d are preferably activated by means of the second electronic device B. According to the example, the second wheel valves cannot be activated by means of the first electronic device A, i.e. the second wheel valves are activated exclusively by means of the second electronic device B.

In order to make available high availability of the wheel-specific closed-circuit pressure control, at least the second wheel valves 7a-7d are supplied with electrical energy by a redundant power supply. Alternatively, the second electronic device B is supplied with electrical energy by a redundant power supply.

According to the example, the first pressure source 5 is formed by what is referred to as a linear actuator. For this purpose, the pressure source 5 has an electric motor 22, the rotational movement of which is converted by means of a schematically indicated rotational-translational transmission 23 into a translational movement of a piston 21, which is moved in an activation direction 24 into a hydraulic pressure space 20 in order to build pressure. To reduce the pressure, the piston 21 is moved in the direction opposite to the activation direction 24.

The pressure space 20 of the first pressure source 5 is hydraulically connected to the first brake supply line 13 independently of the activation state of the piston 21.

The pressure space 20 is also connected, in an unactivated state of the piston 21, to the pressure medium reservoir vessel 4 via one or more snifter holes. According to the example, there is a connecting bore in the piston 21, which bore connects the pressure space 20 to a connecting region which, in the unactivated state of the piston 21, is hydraulically connected to the pressure medium reservoir vessel 4 by a return line 26. The connection between the pressure space 20 and the return line 26 (and therefore the pressure medium reservoir vessel 4) is disconnected when there is (sufficient) activation of the piston 21 in the activation direction 24.

So that there is a hydraulic connection between the pressure space 20 and the pressure medium reservoir vessel 4 in a non-energized state of the electric motor 22, a resetting element 25, e.g. a compression spring, is provided in the pressure space 20, which resetting element 25 positions the piston 21 in the unactivated state, e.g. at a stop counter to the activation direction, when the electric motor 22 is de-energized. In order to permit this, the rotational-translational transmission 23 is not configured in a self-locking fashion. Therefore, when the electric motor 22 is not energized (and the first wheel valves 6a-6d are not energized), the wheel brakes 8a-8d are connected to the pressure medium reservoir vessel 4 with the effect of a pressure equalization. Therefore, e.g. brake pressure can be reduced in the wheel brakes 8a-8d.

According to the example, the second pressure source 2 is embodied as a piston pump. The suction side 40 of the piston pump is connected to the pressure medium reservoir vessel 4 via an intake line 46.

The pressure side 41 of the piston pump is connected to the second brake supply line 33, and therefore to the second wheel valves 7a-7d. A nonreturn valve which closes in the direction of the pressure medium reservoir vessel 4 is provided at or before the suction port of the piston pump. A nonreturn valve which opens in the direction of the brake supply line 33 is provided at or before the pressure port of the piston pump. The specified nonreturn valves are usually part of the piston pump, which is indicated in FIG. 1 by the dashed lines.

An isolating valve 3 which is closed when de-energized and is used to perform closed-loop control of the pressure of the piston pump by means of overflow is advantageously connected hydraulically in parallel with the piston pump. According to the example, a hydraulic connection 47 is provided between the brake supply line 33 and the intake line 46 in which the isolating valve 3 is arranged.

The isolating valve 3 is activated by means of the second electronic device B, in order to ensure closed-loop pressure control. According to the example, the isolating valve 3 cannot be activated by means of the first electronic device A, i.e. the isolating valve 3 is activated exclusively by means of the second electronic device B.

The exemplary brake system in FIG. 1 advantageously comprises in total only nine solenoid valves 6a-6d, 7a-7d, 3.

According to the example, the wheel brakes 8a and 8b are assigned to one of the vehicle axles, and the wheel brakes 8c and 8d are assigned to the other vehicle axle.

In order to be able to carry out axle-based blending or set axle-based different brake pressures, according to one exemplary embodiment (not illustrated) a further electrically activated valve, also referred to as the first circuit isolating valve, is advantageously arranged in the first brake supply line 13, between in each case two of the first wheel valves, specifically according to the example between the wheel valves 6a, 6b and the wheel valves 6c, 6d. Furthermore, yet another electrically activated valve, also referred to as the second circuit isolating valve, is arranged in the second brake supply line 33, between in each case two of the second wheel valves, specifically according to the example between the wheel valves 7a, 7b and the wheel valves 7c, 7d. In this way, the two first wheel valves 6c, 6d can be hydraulically disconnected from the first pressure source 5 by the first circuit isolating valve, and the two second wheel valves 7a, 7b can be hydraulically disconnected from the second pressure source 2 by the second circuit isolating valve, wherein the two second wheel valves 7a, 7b are assigned to different wheel brakes than the two first wheel valves 6c, 6d.

Methods for operating the exemplary brake systems are described below.

The brake systems according to the example are "fail-operational" brake systems for autonomous driving with two redundant pressure sources. According to the example, the pressure sources are embodied as a linear actuating drive (linear actuator 5 with electric motor M1) and as a piston pump drive (actuator 2 with electric motor M2). Alternatively, it is also possible to combine two linear drives or two piston drives. The pressure sources 2 and 5, or their actuators, are advantageously optimized for two different operating points.

The driver's braking request or the autopilot braking setpoint value is available for the implementation of a "by-wire-brake system" of the closed-loop pressure source control on a communications bus (not illustrated).

The brake system comprises two redundant electrical energy sources (vehicle electrical systems) or is connected thereto, wherein the electrical components are supplied, as described above, by one and/or the other of the energy sources (characterized by A or B in FIG. 1).

The system pressure is detected by means of two redundant pressure sensors 12a, 12b and is read in as an actual value by the closed-loop pressure control system.

During a normal braking process in the "by-wire-operating mode" (in particular in the fault-free operating mode of the vehicle electrical system) no valves are connected and the wheel brakes 8a-8d are coupled hydraulically to the first pressure source 5 in a "single-circuit" fashion via the first valves 6a-6d. The buildup of pressure in the pressure space 20 occurs as a result of moving over the snifter hole with the piston 21.

In the event of a failure of the (first) vehicle electrical system assigned to the first pressure source 5 (or of the first electronic device A) the pressure source 2 takes over the execution of the normal braking operation. Since the first wheel valves 6a-6d which are open when de-energized are of redundant design with two supply voltages (i.e. can be activated by means of the first energy source or the first electronic device A and by means of the second energy source or the second electronic device B), the first wheel valves 6a-6d are now closed by means of the other (second) energy source/vehicle electrical system (or actuation supply voltage, electronic device B), and the second wheel valves 7a-7d which are closed when de-energized are opened. Pressure is built up by means of the piston pump 2. The isolating valve 3 which is closed when de-energized is used to perform closed-loop pressure control.

During an anti-lock brake control operation (ABS operation) in the fault-free operating mode of the vehicle electrical system, pressure is made available by the first pressure source 5. A wheel-specific closed-loop pressure control process is carried out by means of the first and second wheel valves 6a-6d, 7a-7d. In order to reduce pressure, pressure medium is discharged into the pressure medium reservoir vessel 4 via the second wheel valve or valves 7a-7d, and the actuated (opened) isolating valve 3

A wheel-specific closed-loop pressure control process is possible even when there are a number of faults in the first pressure source 5 or the first device A as long as it is ensured that the restoring spring 25 pushes back the possibly displaced piston 21 and the hydraulic connection from the pressure space 20 to the pressure medium reservoir vessel 4 is "cleared" via the snifter hole. Pressure is then built up via the second pressure source 2 and pressure is reduced via the first wheel valves 6a-6d and the pressure space 20 of the first pressure source 5.

During an anti-lock brake control operation (ABS operation) when the vehicle electrical system has failed, the second pressure source 2 takes over the execution of the anti-lock brake control operation in the event of a fault in the first energy supply (A). For a central closed-loop pressure control process, the first wheel valves 6a-6d are closed (by means of device B) and the second wheel valves 7a-7d are actuated or opened (by means of device B).

A central closed-loop pressure control process via the first pressure source 5 also takes place when the second energy supply (B) fails.

When various leakage locations and corresponding measures are considered, the following main scenarios are found to occur:

Leakage at a wheel brake: The affected wheel brake is isolated by closing the corresponding first and second wheel valves.

Leakage in the second pressure source 2: The specific connection of the wheel brakes to the first and second pressure sources via the first and second wheel valves includes isolation of the second pressure source, so that a full system performance is maintained.

Leakage in the first pressure source 5: The specific connection of the wheel brakes to the first and second pressure sources via the first and second wheel valves includes isolation of the first pressure source, so that a full normal braking performance is maintained. The first wheel valves 6a-6d are closed by means of the actuation device B in order to isolate the first pressure source.

The connection of the wheel brakes 8a-8d to the snifter hole of the first pressure source 5 via the valves 6a-6d which are open when de-energized ensures there is a reduction in pressure in the wheel brakes 8a-8d when there is no braking request.

Axle-based blending can be implemented by introducing two further valves (circuit isolating valves) between in each case two first wheel valves which are open when de-energized and second wheel valves which are closed when de-energized.

As result of the described connection of the two redundant pressure sources in the "fail-operational system", the isolating valves which are known from other brake systems, e.g. from 10 2013 217 954 A1, between the pressure source and wheel valves are dispensed with, with the result that only nine valves 6a-6d, 7a-7d, 3 are required to implement the closed-loop control functions in the brake system according to the example in FIG. 1.

In particular for electric vehicles, the brake system according to an aspect of the invention provides the advantage of minimal power consumption, since a normal braking operation does not require any valves to be additionally switched and the initial idle state is maintained.

A further advantage of an aspect of the invention is that the wheel-specific ABS control is maintained for most fault situations. The valves 6a-6d which are open when de-energized are for this purpose constructed with a redundant power supply or actuation means (A and B).

The invention claimed is:

1. A brake system for a motor vehicle with at least our hydraulically activated wheel brakes, comprising:
for each of the wheel brakes an electrically activated first wheel valve which is designed to be open when de-energized and an electrically activated second wheel valve which is designed to be closed when de-energized,
a first electrically activated pressure source, which is connected to each of the first wheel valves via a first brake supply line,
a second electrically activated pressure source, and a pressure medium reservoir vessel which is at atmospheric pressure, wherein, the second electrically activated pressure source is connected to each of the second wheel valves via a second brake supply line such that the second electrically activated pressure source is connected via the second wheel valves to the wheel brakes, wherein the first electrically activated pressure source is hydraulically connected to at least two of the normally open first wheel valves directly with no electrically activated valve arranged between the first electrically activated pressure source and the respective at least two normally open first wheel valves, wherein the second electrically activated pressure source is hydraulically connected to at least two of the normally closed second wheel valves directly with no electrically activated valve arranged between the second electrically activated pressure source and the respective at least two normally closed second wheel valves, and wherein in a normal operating mode of the brake system during a normal braking process only the first electrically activated pressure source is actuated to build up pressure for activating the wheel brakes, wherein no valve of the brake system is activated.

2. The brake system as claimed in claim 1, wherein there is no electrically activated valve arranged in the first brake supply line.

3. The brake system as claimed in claim 1, wherein there is no electrically activated valve arranged in the second brake supply line.

4. The brake system as claimed in claim 1, wherein a first electrically activated circuit isolating valve by which two of the first wheel valves can be hydraulically disconnected from the first pressure source is arranged in the first brake supply line.

5. The brake system as claimed in claim 4, wherein a second electrically activated circuit isolating valve by which two of the second wheel valves can be hydraulically disconnected from the second pressure source is arranged in the second brake supply line, wherein the two second wheel valves are assigned to different wheel brakes than the two first wheel valves.

6. The brake system as claimed in claim 1, wherein said brake system further comprises a first electronic device by which the first pressure source is activated, and a second electronic device by which the second pressure source is activated, wherein the second electronic device is electrically independent of the first electronic device.

7. The brake system as claimed in claim 6, wherein the first wheel valves are each designed to be able to be actuated in redundant fashion, such that each of the first wheel valves can be activated by the first electronic device and by the second electronic device.

8. The brake system as claimed in claim 6, wherein the second wheel valves are activated by the second electronic device.

9. The brake system as claimed in claim 6, wherein the first electronic device is supplied by a first electrical energy supply or comprises a first electrical energy supply, and the second electronic device is supplied by a second electrical energy supply or comprises a second electrical energy supply, wherein the first electrical energy supply is independent of the second electrical energy supply.

10. The brake system as claimed in claim 1, wherein at least one of the pressure sources is embodied as a cylinder-piston assembly with a pressure, space which is bounded by a piston which can be moved, by an electric motor and a rotational-translational transmission, in an activation direction to build up pressure and in a direction opposite to the activation direction to reduce pressure.

11. The brake system as claimed in claim 10, wherein in an unactivated state of the piston the pressure space is connected to the pressure medium reservoir vessel via at least one snifter hole, wherein this connection is interrupted when the piston is activated.

12. The brake system as claimed in claim 10, wherein a resetting element, which positions the piston in the unactivated state when the electric motor is de-energized, is provided in the pressure space.

13. The brake system as claimed in claim 1, wherein at least one of the pressure sources is embodied as a piston pump whose suction side is connected to the pressure medium reservoir vessel and whose pressure side is connected to the brake supply line which is assigned to the pressure source, wherein an electrically activated isolating valve, which is designed to be closed when de-energized, is connected hydraulically in parallel with the piston pump.

14. The brake system as claimed in claim 6, wherein at least one of the pressure sources is embodied as a piston pump whose suction side is connected to the pressure medium reservoir vessel and whose pressure side is connected to the brake supply line which is assigned to the pressure source, wherein an electrically activated isolating valve, which is designed to be closed when de-energized, is connected hydraulically in parallel with the piston pump and wherein the isolating valve is activated by the electronic device which is assigned to the pressure source.

15. A method for operating a brake system as claimed in claim 1, wherein in the event of a failure of the first pressure source or of the first electronic device, by the second electronic device, the first wheel valves are closed and the second wheel valves are opened and the second pressure source is activated to build up a pressure.

16. The method as claimed in claim 15, wherein in the event of a failure of the first pressure source or of the first electronic device a wheel-specific slip control process is carried out, by the second electronic device, wherein a reduction in pressure is carried out at one of the wheel brakes by opening the corresponding first wheel valve, and wherein pressure medium flows away to the pressure medium reservoir vessel via the first pressure source and a return line.

17. The brake system as claimed in claim 1, wherein there is no valve arranged in the first brake supply line.

18. The brake system as claimed in claim 2, wherein there is no valve arranged in the second brake supply line.

19. The brake system as claimed in claim 11, wherein a resetting element, which positions the piston in the unactivated state when the electric motor is de-energized, is provided in the pressure space.

20. The brake system as claimed in claim 7, wherein the second wheel valves are activated by the second electronic device.

* * * * *